(12) United States Patent
Hsu

(10) Patent No.: US 11,707,657 B2
(45) Date of Patent: Jul. 25, 2023

(54) GOLF-SHOT-TRACKING-SELF-DRIVING-PATH CENTRAL CONTROLLING SYSTEM

(71) Applicant: SUNRISE RESORT, INC., Taipei (TW)

(72) Inventor: Yuh-Rong Hsu, Taipei (TW)

(73) Assignee: SUNRISE RESORT, INC., Taoyuan (TW)

( * ) Notice: Subject to any disclaimer, the term of this patent is extended or adjusted under 35 U.S.C. 154(b) by 0 days.

(21) Appl. No.: 17/297,306

(22) PCT Filed: Feb. 13, 2020

(86) PCT No.: PCT/CN2020/075064
§ 371 (c)(1),
(2) Date: May 26, 2021

(87) PCT Pub. No.: WO2021/159383
PCT Pub. Date: Aug. 19, 2021

(65) Prior Publication Data
US 2022/0379182 A1    Dec. 1, 2022

(51) Int. Cl.
*A63B 55/60* (2015.01)
*G05D 1/02* (2020.01)

(52) U.S. Cl.
CPC ........... *A63B 55/60* (2015.10); *G05D 1/0212* (2013.01); *G05D 2201/0204* (2013.01)

(58) Field of Classification Search
CPC ............. A63B 55/60; G05D 1/0212; G05D 2201/0204; G05D 1/0297; G05D 1/12; B60W 30/095
See application file for complete search history.

(56) References Cited

U.S. PATENT DOCUMENTS

| 10,197,999 | B2* | 2/2019 | Doane | G05D 1/0278 |
| 2004/0260467 | A1* | 12/2004 | Wehrlen | G05D 1/0291 |
| | | | | 701/36 |
| 2009/0228166 | A1* | 9/2009 | Durkos | G05D 1/0246 |
| | | | | 701/26 |
| 2011/0230274 | A1* | 9/2011 | Lafortune | A63B 15/00 |
| | | | | 473/217 |

(Continued)

FOREIGN PATENT DOCUMENTS

| EP | 3731054 A1 * | 10/2020 | A63B 55/61 |
| WO | WO-2017024351 A1 * | 2/2017 | A63B 55/60 |
| WO | WO-2019229748 A1 * | 12/2019 | A63B 1/00 |

OTHER PUBLICATIONS

Ep 19193652.5 European search opinion (dated 2020).*

(Continued)

*Primary Examiner* — Calvin Cheung
(74) *Attorney, Agent, or Firm* — Lathrop GPM LLP; William T. Griffith

(57) ABSTRACT

Disclosed is a golf-shot-tracking-self-driving-path central controlling system, comprising a predetermined-paths-determining module, a golf-ball-next-shot-location determining module and a path driving controlling module, to centrally control each of a plurality of golf-shot-tracking fairway-self-driving golf carts to drive in one of a plurality of predetermined paths or shift among the plurality of predetermined paths.

9 Claims, 8 Drawing Sheets

(56) References Cited

U.S. PATENT DOCUMENTS

| | | | |
|---|---|---|---|
| 2012/0089271 A1* | 4/2012 | Silzer, Sr | G05D 1/0278 |
| | | | 701/1 |
| 2017/0102702 A1* | 4/2017 | Ishijima | G05D 1/0278 |
| 2018/0173223 A1* | 6/2018 | Doane | G05D 1/0255 |
| 2020/0038724 A1* | 2/2020 | Vanlandingham | |
| | | | B60W 30/0953 |

OTHER PUBLICATIONS

Brenton Barker, Golf Rules 101: A Simple Beginner's Guide to the Rules of Golf, retrieved from https://golfmonster.com/golf-rules/ (Year: 2021).*

* cited by examiner

GOLF-SHOT-TRACKING-SELF-DRIVING-PATH CENTRAL CONTROLLING SYSTEM

CROSS REFERENCE TO RELATED APPLICATION

This application is a national phase entry under 35 U.S.C. § 371 of PCT Application No. PCT/CN2020/75064, entitled "GOLF-SHOT-TRACKING-SELF-DRIVING-PATH CENTRAL CONTROLLING SYSTEM", which is filed on Feb. 13, 2020, the entire contents of which are incorporated in this application by reference.

FIELD OF THE INVENTION

The present invention relates to a self-driving car, and more particularly relates to a golf-shot-tracking-self-driving-path central controlling system for centrally controlling golf-shot-tracking fairway-self-driving golf carts in a fairway of a golf course.

BACKGROUND OF THE INVENTION

A self-driving car, also called a driverless car or an autonomous car, is a vehicle which drives without human control according to sensing position information or environment sensing result. In recent years, with the improvement of satellite signals and environmental sensing technology, as well as the continuous efforts in technique of decision-making, command transmission and mechanism action of vehicles, the self-driving cars has made rapid progress.

At present, the technology applying self-driving cars to a golf course fairway is still immature. The reason is that such a technique needs to consider turf damage maintenance and golfer convenience as well. The inventor of the present invention believes that a golf-shot-tracking fairway-self-driving golf cart is a solution to the problem. This is because if the paths in the fairway are not well determined, the turf repeatedly run over by golf cart will indeed cause damage to the fairway, including unpredictable damage to a maintenance area of the fairway or the surrounding area with sprinklers, bunkers and pools. However, for technique of fairway self-driving golf cart, it has become an issue about how to bring convenience for golfer and also consider avoiding golf turf damage as well. A self-driving golf cart, which is limited to run on predetermined paths and is with golf-shot-tracking function, has not been applied in golf industry. The present invention, a golf-shot-tracking-self-driving-path central controlling system for central controlling golf-shot-tracking fairway-self-driving golf carts in a fairway of a golf course, is a solution for the above.

SUMMARY OF THE INVENTION

Accordingly, one objective of the present invention is to provide a golf-shot-tracking-self-driving-path central controlling system that enables each of a plurality of golf-shot-tracking fairway-self-driving golf carts to drive in one of a plurality of predetermined paths or shifts among the plurality of predetermined paths according to the track of a golf ball.

In order to overcome the technical problems in prior art, the present invention provides a golf-shot-tracking-self-driving-path central controlling system, which centrally controls a plurality of golf-shot-tracking fairway-self-driving golf carts to self-drive in a fairway of a golf course in a manner that each golf-shot-tracking fairway-self-driving golf cart drives in one of a plurality of predetermined paths or shifts among the plurality of predetermined paths, the golf-shot-tracking-self-driving-path central controlling system comprising: a predetermined-paths-determining module, which determines the plurality of predetermined paths in the fairway, wherein when the golf-shot-tracking fairway-self-driving golf cart is configured to be in a self-driving condition, in addition to shifting among the plurality of predetermined paths, the golf-shot-tracking fairway-self-driving golf cart is limited to drive within a path area of the plurality of predetermined paths; a golf-ball-next-shot-location determining module, connected to the predetermined-paths-determining module, determining a golf-ball-next-shot location in the golf course, the golf-ball-next-shot location is a location of a golf ball after a golfer shoots the golf ball; and a path driving controlling module, connected to the predetermined-paths-determining module and the golf-ball-next-shot-location determining module, determining one selected predetermined path and/or a shifting path among the plurality of predetermined paths for the plurality of golf-shot-tracking fairway-self-driving golf carts which drive in the fairway of the golf course according to the golf-ball-next-shot-location, and controlling the plurality of golf-shot-tracking fairway-self-driving golf carts to self-drive in the selected predetermined path and/or in the shifting path, after the golfer shot the golf ball.

In one embodiment of the present invention, the golf-shot-tracking-self-driving-path central controlling system is provided, wherein the golf-ball-next-shot-location determining module determines a plurality of the golf-ball-next-shot-locations in the golf course, each golf-ball-next-shot location is a location of a golf ball after each one of a plurality of the golfers shoots the golf ball, and the path driving controlling module determines a driving route from predetermined paths and/or determines a shifting route which shifts among predetermined paths according to a positional relationship among the plurality of golf-ball-next-shot locations such that the golf-shot-tracking fairway-self-driving golf cart is configured to perform self driving in the determined driving route and/or the shifting route.

In one embodiment of the present invention, the golf-shot-tracking-self-driving-path central controlling system is provided, wherein the golf-ball-next-shot-location determining module measures, from the golf-shot-tracking fairway-self-driving golf carts, the respective golf-ball-next-shot locations for all of the golfers who are a group belonging to the golf-shot-tracking fairway-self-driving golf cart, and determines a driving route from predetermined paths and/or determines a shifting route which shifts among predetermined paths according to the respective golf-ball-next-shot location such that the golf-shot-tracking fairway-self-driving golf cart is configured to perform self driving in the determined driving route and/or the shifting route.

In one embodiment of the present invention, the golf-shot-tracking-self-driving-path central controlling system is provided, wherein the golf-ball-next-shot-location determining module measures, from the plurality of golf-shot-tracking fairway-self-driving golf carts, the respective golf-ball-next-shot locations for all of the golfers who are a group belonging to the plurality of golf-shot-tracking fairway-self-driving golf carts, and after the current golf-ball-next-shot location for one golfer measured by a first golf-shot-tracking fairway-self-driving golf cart of the plurality of golf-shot-tracking fairway-self-driving golf carts has been determined, the golf-ball-next-shot location determining module measures, from a second golf-shot-tracking fairway-self-driving golf cart of the plurality of golf-shot-tracking fairway-self-driving golf carts, the golf-ball-next-shot location for said golfer.

In one embodiment of the present invention, the golf-shot-tracking-self-driving-path central controlling system is provided further comprising a predetermined path excluding determining module connected to the predetermined-paths-determining module, wherein the predetermined path excluding determining module determines whether any unsuitable predetermined path is to be excluded from the plurality of predetermined paths such that the predetermined path/paths from which the unsuitable predetermined path has been excluded is/are assigned as suitable predetermined path/paths in a manner that the suitable predetermined path/paths excluding the unsuitable predetermined path is enabled to be optionally added back the unsuitable predetermined path and used as the plurality of predetermined paths.

In one embodiment of the present invention, the golf-shot-tracking-self-driving-path central controlling system is provided, wherein the path driving controlling module selects all or a portion of the suitable predetermined paths from the suitable predetermined paths as a candidate predetermined path group, and according to the golf-ball-next-shot-location, determines one suitable predetermined path from the candidate predetermined path group as the selected predetermined path and determines the shifting path among the suitable predetermined paths such that the golf-shot-tracking fairway-self-driving golf cart performs self driving in the selected predetermined path and/or in the shifting path, and the path driving controlling module transmits the selected predetermined path to each golf-shot-tracking fairway-self-driving golf cart to control each golf-shot-tracking fairway-self-driving golf cart continuously drive in the predetermined path.

In one embodiment of the present invention, the golf-shot-tracking-self-driving-path central controlling system is provided, wherein the path driving controlling module selects the candidate predetermined path group according to a self-driving area maintenance plan.

In one embodiment of the present invention, the golf-shot-tracking-self-driving-path central controlling system is provided, wherein the path driving controlling module determines, from a plurality of predetermined shifting paths, the shifting path among the predetermined paths, wherein the plurality of the predetermined shifting paths are determined in advance according to fairway related information.

In one embodiment of the present invention, the golf-shot-tracking-self-driving-path central controlling system is provided further comprising a previous neighboring group location receiving module, which receives current locations of all golfers who belong to a previous neighboring group, and wherein when a shortest distance from the current locations of all the golfers who belong to the previous neighboring group to the current location of the golfer who belongs to the present group of the golf-shot-tracking fairway-self-driving golf cart is greater than a predetermined threshold distance, the previous neighboring group location receiving module transmits a golf-ball shot permission signal to notice that the golfer who belongs to the present group of the golf-shot-tracking fairway-self-driving golf cart is permitted to shoot the golf ball.

With the technical means adopted by the present invention, the golf-shot-tracking-self-driving-path central controlling system can centrally controls a plurality of golf-shot-tracking fairway-self-driving golf carts to self-drive in a fairway of a golf course in a manner that each golf-shot-tracking fairway-self-driving golf cart drives in one of a plurality of predetermined paths or shifts among the plurality of predetermined paths. The present invention controls the plurality of golf-shot-tracking fairway-self-driving golf carts to self-drive in the predetermined paths and/or in a shifting path by: (1) determining the plurality of predetermined paths in the fairway; (2) determining, in the golf course, a golf-ball-next-shot location which is a location of a golf ball after a golfer shoots the golf ball; and (3) determining one selected predetermined path and/or the shifting path among the plurality of predetermined paths for the plurality of golf-shot-tracking fairway-self-driving golf carts which drive in the fairway of the golf course according to the golf-ball-next-shot-location. In one embodiment, a driving route and/or a shifting route is determined from the predetermined paths according to a positional relationship among the plurality of golf-ball-next-shot locations such that the golf-shot-tracking fairway-self-driving golf cart is configured to perform self driving in the determined driving route and/or the shifting route. Therefore on the premise that the golf-shot-tracking fairway-self-driving golf cart can perform self driving in the determined driving route and/or the shifting route to effectively avoid damage to the unintended position in the fairway, it can also guide the golfer to the golf-ball-next-shot location and thus bring convenience to the golfer. In one embodiment, the present invention measures the respective golf-ball-next-shot locations for all of the golfers who are a group belonging to the golf-shot-tracking fairway-self-driving golf cart, and determines the driving route from predetermined paths and/or determines the shifting route which shifts among predetermined paths according to the respective golf-ball-next-shot location. In one embodiment, the present invention measures the golf-ball-next-shot location for a golfer of a first golf-shot-tracking fairway-self-driving golf cart from a second golf-shot-tracking fairway-self-driving golf cart.

DETAILED DESCRIPTION OF THE PREFERRED EMBODIMENTS

Figure 1:
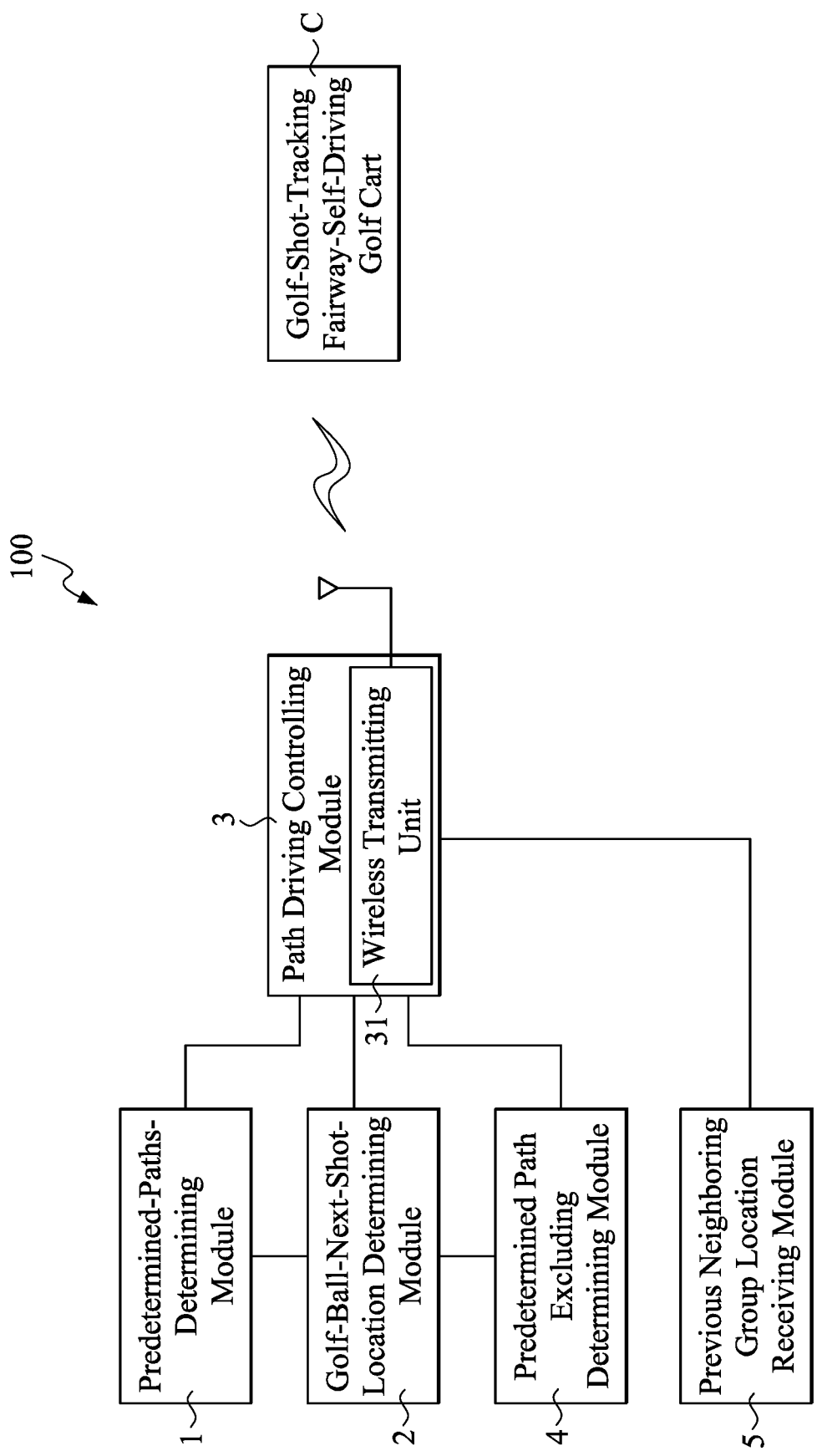
FIG. 1 is a schematic block diagram illustrating a golf-shot-tracking-self-driving-path central controlling system according to one embodiment of the present invention.

The preferred embodiments of the present invention are described in detail below with reference to FIG. 1 to FIG. 8. The description is used for explaining the embodiments of the present invention only, but not for limiting the scope of the claims.

As shown in FIG. 1 to FIG. 8, a golf-shot-tracking-self-driving-path central controlling system 100 according to one embodiment of the present invention centrally controls a plurality of golf-shot-tracking fairway-self-driving golf carts C to self-drive in a fairway A of a golf course in a manner that each golf-shot-tracking fairway-self-driving golf cart C drives in one of a plurality of predetermined paths or shifts among the plurality of predetermined paths, and the golf-shot-tracking-self-driving-path central controlling system 100 comprises: a predetermined-paths-determining module 1, a golf-ball-next-shot-location determining module 2, a path driving controlling module 3 and a predetermined path excluding determining module 4.

As shown in FIG. 1 to FIG. 8, the predetermined-paths-determining module 1 determines a plurality of predetermined paths P0, P1, P2, P3 and P4 in the fairway A, wherein when the golf-shot-tracking fairway-self-driving golf cart C is configured to be in a self-driving condition, in addition to shifting among the plurality of predetermined paths, the golf-shot-tracking fairway-self-driving golf cart C is limited to drive within a path area of the plurality of predetermined paths P0, P1, P2, P3 and P4. In one embodiment, the width of the path area is the cart width of the golf-shot-tracking fairway-self-driving golf cart C plus a predetermined width. For example, when the cart width of the golf-shot-tracking fairway-self-driving golf cart C is 2.1 meters, the width of the path area is the cart width of 2.1 meters plus a predetermined width of 40 cm, which is 2.5 meters. Each predetermined path may be mapped out according to an area map or according to a practical survey performed by a golf course administrator. In the case that each predetermined path is defined according to the area map, the area map may be built by the predetermined-paths-determining module 1 of the golf-shot-tracking-self-driving-path central controlling system 100 of the present invention. As shown in FIG. 2 to FIG. 8, the area map covers the fairway A, and the area map is built according to an electronic map of the fairway A and topographical features of the fairway A. The data of the area map is combined with actual locations, i.e., the golf course, by location information of a global navigation satellite system (GNSS) such that the golf-shot-tracking fairway-self-driving golf cart C can drive in a self-driving manner according to the area map. In another embodiment, by utilizing practical survey paths obtained by the practical survey performed by the golf course administrator, each predetermined path P0, P1, P2, P3, P4 can be determined within the area map by referring the obtained practical survey paths corresponding to the area map. In one embodiment, after the plurality of predetermined paths (e.g., a total of nine predetermined paths) have been determined in the fairway A, the predetermined-paths-determining module 1 can evenly assign multiple predetermined paths of the plurality of predetermined paths (e.g., three of the nine predetermined paths) to the plurality of the golf-shot-tracking fairway-self-driving golf carts C to be dispatched on that day. For example, the golf-shot-tracking fairway-self-driving golf carts of a first group are assigned multiple predetermined paths (e.g., the first, second and third predetermined paths among the nine predetermined paths), the golf-shot-tracking fairway-self-driving golf carts of a second group are assigned multiple predetermined paths (e.g., the fourth, fifth and sixth predetermined paths among the nine predetermined paths), and the golf-shot-tracking fairway-self-driving golf carts of a third group are assigned multiple predetermined paths (e.g., the seventh, eighth and ninth predetermined paths among the nine predetermined paths) to avoid damage to the turf due to excessive concentration of certain predetermined paths. Different groups may be assigned duplicate predetermined paths. For example, three different groups may be assigned the same one predetermined path. After assigning predetermined paths to the plurality of the golf-shot-tracking fairway-self-driving golf carts C to be dispatched on that day, the golf-shot-tracking-self-driving-path central controlling system 100 of the present invention may or may not receive historical data and/or real-time data of the predetermined paths in which the golf-shot-tracking fairway-self-driving golf carts C drive.

As shown in FIG. 1 to FIG. 8, the golf-ball-next-shot-location determining module 2 is connected to the predetermined-paths-determining module 1, the golf-ball-next-shot-location determining module 2 determines a golf-ball-next-shot location in the golf course, and the golf-ball-next-shot location is a location of a golf ball after a golfer shoots the golf ball. The golf-ball-next-shot-location determining module 2 may be a golf-ball-shot trajectory measuring device which is disposed on the golf-shot-tracking fairway-self-driving golf cart C and, by parking the golf-shot-tracking fairway-self-driving golf cart C behind the tee box after teeing off or parking the golf-shot-tracking fairway-self-driving golf cart C behind the golfer who shoots the golf ball in the fairway, measures the golf ball trajectory and/or the golf ball shot direction and/or the golf ball shot distance of the golfer to estimate the golf-ball-next-shot location. In another embodiment, the golf-ball-next-shot-location determining module 2 may be a golf-ball-shot trajectory measuring device which can be disposed on the tee box, the telephone pole or a top of a building, and can covertly protrude from the ground.

Figure 2:
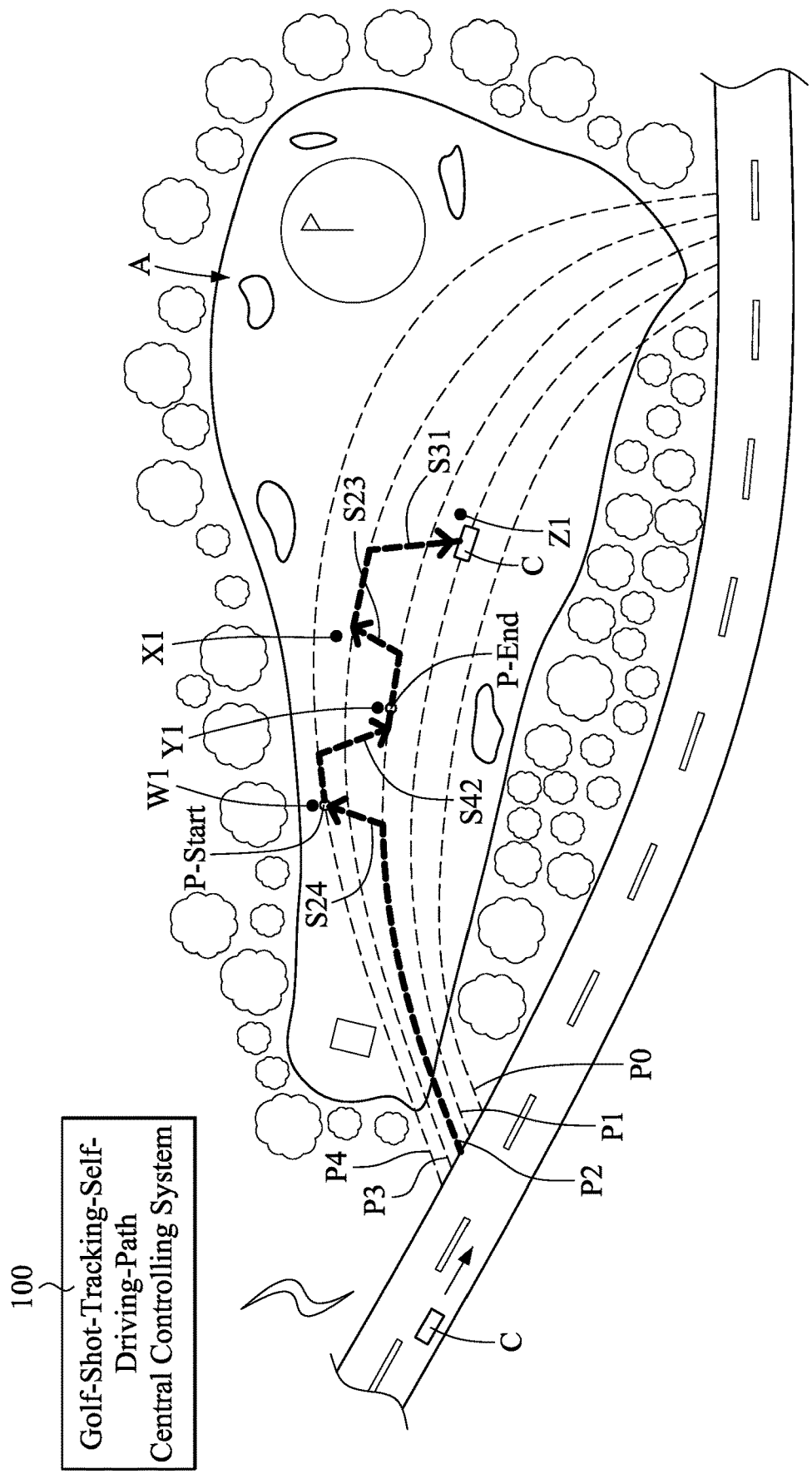
FIG. 2 is a schematic diagram illustrating the golf-shot-tracking-self-driving-path central controlling system applied to a fairway of a golf course according to the embodiment of the present invention.

Take FIG. 2 as an example, by parking the golf-shot-tracking fairway-self-driving golf cart C behind the tee box after teeing off, the golf-ball-next-shot-location determining module 2 determines that the golf-ball-next-shot locations of a first golfer, a second golfer, a third golfer and a fourth golfer respectively are "W1", "X1", "Y1" and "Z1". After the four golf-ball-next-shot locations W1, X1, Y1 and Z1 have been determined, the path driving controlling module 3 will select, from the plurality of predetermined paths P0, P1, P2, P3 and P4, one selected predetermined path and/or a shifting path in which the golf-shot-tracking fairway-self-driving golf cart is controlled to self-drive. The path selection can be performed based on the shortest walking distance, the designated basic path of the day, or the age of the golfer. In FIG. 2, it is based on the designated basic path of the day (predetermined path P2), and basically drives in the predetermined path P2, and after leaving from the predetermined path P2 to other paths (for example, shifting to predetermined path P4 via a shifting path S24), it returns to the predetermined path P2 via a shifting path S42. Shifting paths S24, S42, S23 and S31 shown in FIG. 2 may be shifting paths determined in advance among the predetermined paths, or the longest reachable distance from a starting point (e.g., "P-Start") on one predetermined path to a target point (e.g., "P-END") on another predetermined path to prevent the golfer from feeling uncomfortable due to the excessive turning angle when shifting among the predetermined paths.

As shown in FIG. 1 to FIG. 8, the path driving controlling module 3 is connected to the predetermined-paths-determining module 1 and the golf-ball-next-shot-location determining module 2, the path driving controlling module 3 determines (for example, in a centrally controlling manner; however, the present invention is not limited to this and the determination can be performed in other manner different from the centrally controlling manner, such as, the determination can be performed prior to the dispatch of the golf-shot-tracking fairway-self-driving golf cart C) one selected predetermined path and/or a shifting path among the plurality of predetermined paths P0, P1, P2, P3 and P4 for the plurality of golf-shot-tracking fairway-self-driving golf carts C which drive in the fairway A of the golf course according to the golf-ball-next-shot-location, and controls the plurality of golf-shot-tracking fairway-self-driving golf carts C to self-drive in the selected predetermined path and/or in the shifting path, after the golfer shot the golf ball. Preferably, the path driving controlling module 3 determines, from a plurality of predetermined shifting paths, the shifting path among the predetermined paths, wherein the plurality of the predetermined shifting paths are determined in advance according to fairway related information. Specifically, the fairway related information may be the topography of the fairway A, specific designated maintenance areas, the weather conditions of the golf course, etc., and according to the fairway related information, the predetermined shifting paths are determined in advance among the plurality of the predetermined paths P0, P1, P2, P3 and P4 of the fairway A, so that the path driving controlling module 3 can in sequence determines the shifting path from the plurality of predetermined shifting paths, and thereby further reducing or avoiding damage to the unintended position in the fairway A.

Figure 3:
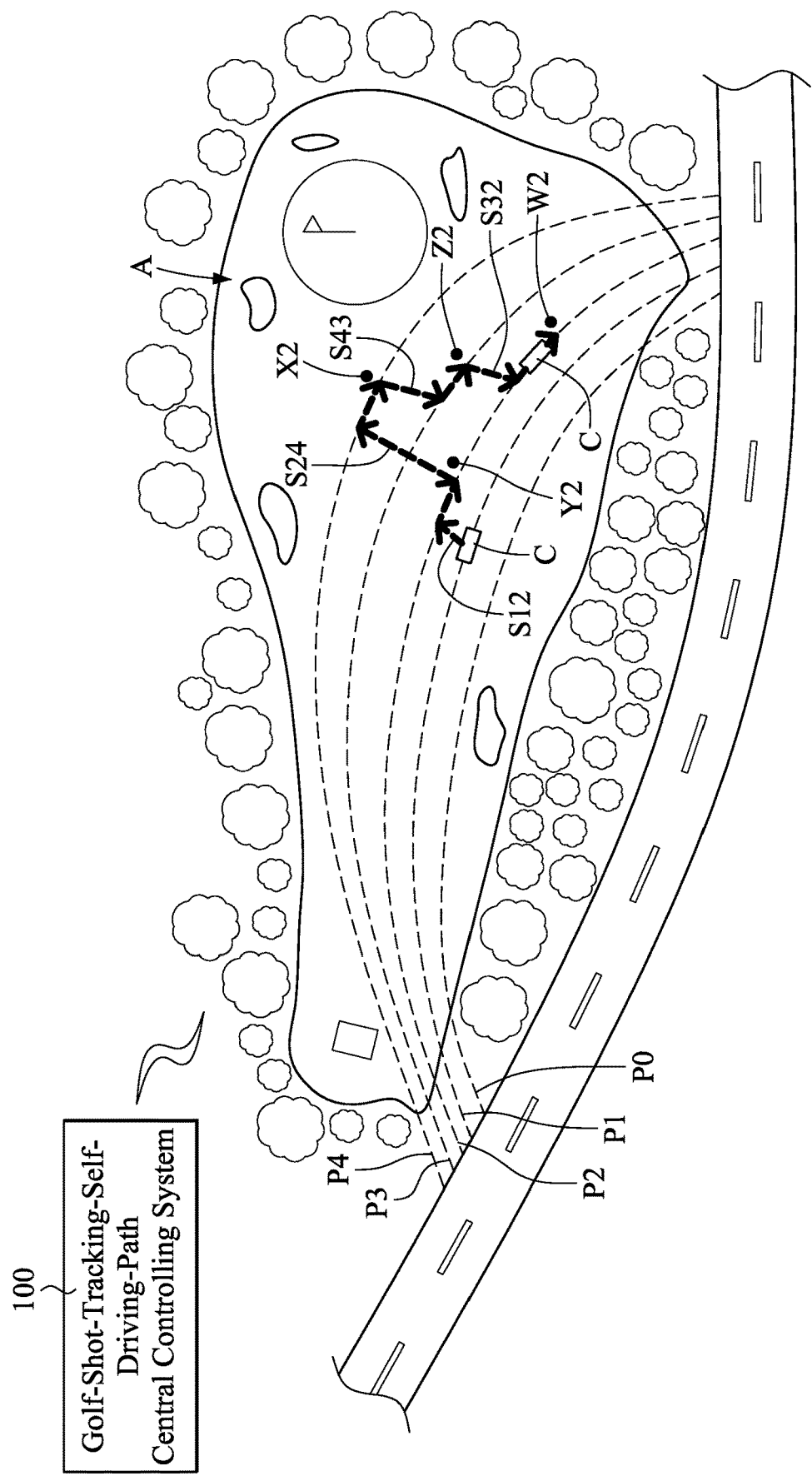
FIG. 3 is a schematic diagram illustrating the golf-shot-tracking-self-driving-path central controlling system applied to the fairway of the golf course according to the embodiment of the present invention.

As shown in FIG. 1 and FIG. 2, the golf-ball-next-shot-location determining module 2 in FIG. 1 determines a plurality of the golf-ball-next-shot-locations W1, X1, Y1 and Z1 (as shown in FIG. 2) in the golf course, each golf-ball-next-shot location is a location of a golf ball after each one of a plurality of the golfers shoots the golf ball, and the path driving controlling module determines a driving route P2 from predetermined paths P0, P1, P2, P3 and P4 and/or determines a shifting route S24, S42, S23, S31 which shifts among predetermined paths according to a positional relationship among the plurality of golf-ball-next-shot locations W1, X1, Y1 and Z1 such that the golf-shot-tracking fairway-self-driving golf cart C is configured to perform self driving in the determined driving route P2 and/or the shifting route S24, S42, S23, S31. Furthermore, as shown in FIG. 1 and FIG. 3, the golf-ball-next-shot-location determining module 2 measures, from the golf-shot-tracking fairway-self-driving golf carts C, the respective golf-ball-next-shot locations W1, X1, Y1 and Z1 for all of the golfers who are a group belonging to the golf-shot-tracking fairway-self-driving golf cart C, and determines a driving route P2 from predetermined paths P0, P1, P2, P3 and P4 and/or determines a shifting route S12, S24, S43, S32 which shifts among predetermined paths according to the respective golf-ball-next-shot location W1, X1, Y1 and Z1 such that the golf-shot-tracking fairway-self-driving golf cart C is configured to perform self driving in the determined driving route P2 and/or the shifting route S12, S24, S43, S32. In one embodiment, the selection of the predetermined path is to select a path closest to each golf-ball-next-shot location W1, X1, Y1, Z1.

According to the distance between the golf-ball-next-shot locations W1, X1, Y1 and Z1 and the hole, the golf-shot-tracking fairway-self-driving golf cart C drives in the predetermined path and/or the shifting path among the predetermined paths, from far to near. For example, in FIG. 2, according to the golf-ball-next-shot locations W1, X1, Y1 and Z1 from far to near, the golf-shot-tracking fairway-self-driving golf cart C sequentially drives in the predetermined path P2, the shifting path S24, the predetermined path P4, the shifting path S42, the predetermined path P2, the shifting path S23, the predetermined path P3, the shifting path S31 and the predetermined path P1 based on the designated basic path of the day (in this example, since the predetermined path P2 is used as the designated basic path of the day, the path selection is basically to select the path back to the predetermined path P2).

FIG. 3 is a schematic diagram illustrating a golf-ball-next-shot situation following FIG. 2. In FIG. 3, according to the golf-ball-next-shot locations Y2, X2, Z2 and W2 from far to near, the golf-shot-tracking fairway-self-driving golf cart C sequentially drives in the predetermined path P1, the shifting path S12, the predetermined path P2, the shifting path S24, the predetermined path P4, the shifting path S43, the predetermined path P3, the shifting path S32 and the predetermined path P2. These paths may be determined based on the shortest walking distance, the designated basic path of the day, or the age of the golfer.

Figure 4:
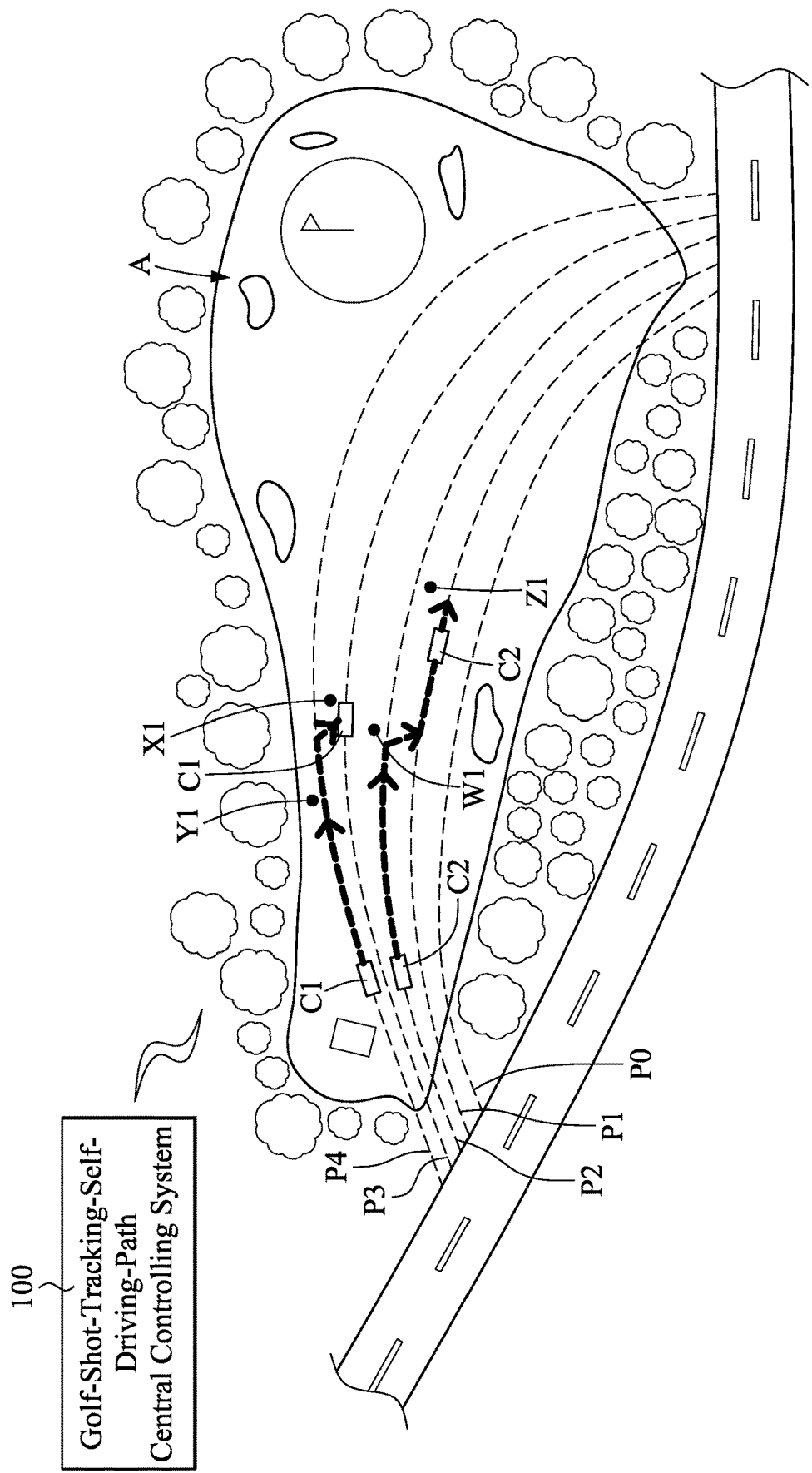
FIG. 4 is a schematic diagram illustrating the golf-shot-tracking-self-driving-path central controlling system applied to the fairway of the golf course according to the embodiment of the present invention.
Figure 5:
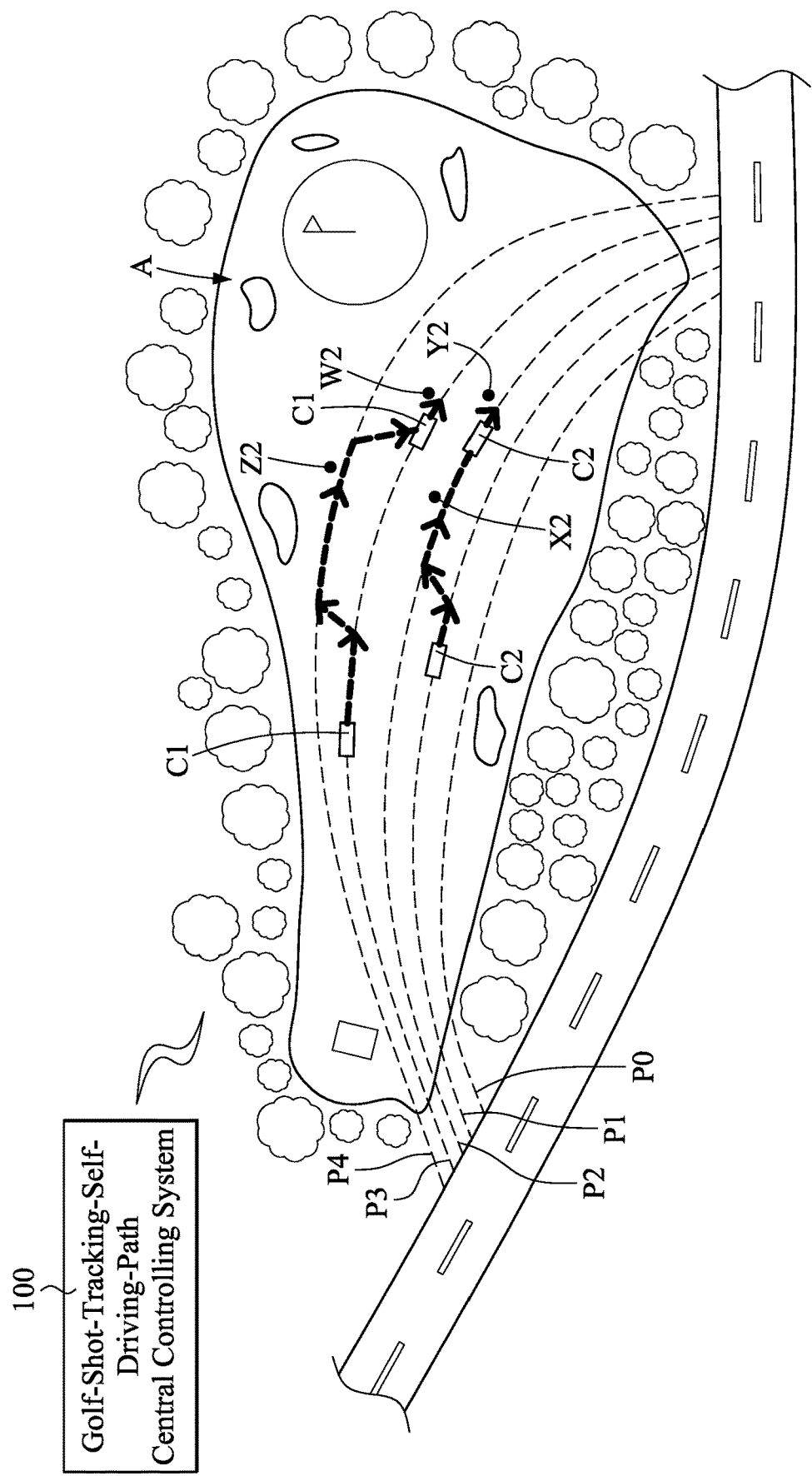
FIG. 5 is a schematic diagram illustrating the golf-shot-tracking-self-driving-path central controlling system applied to the fairway of the golf course according to the embodiment of the present invention.

In FIG. 4, the case of two golf-shot-tracking fairway-self-driving golf carts C is taken as an example, wherein the golf-ball-next-shot-location determining module 2 measures, from the plurality of golf-shot-tracking fairway-self-driving golf carts (two golf-shot-tracking fairway-self-driving golf carts in this example), the respective golf-ball-next-shot locations W1, X1, Y1, Z1 for all of the golfers who are a group belonging to the plurality of golf-shot-tracking fairway-self-driving golf carts C1 and C2, and after the current golf-ball-next-shot location W1, X1 for one golfer measured by a first golf-shot-tracking fairway-self-driving golf cart C1 of the plurality of golf-shot-tracking fairway-self-driving golf carts has been determined, the golf-ball-next-shot location determining module 2 measures, from a second golf-shot-tracking fairway-self-driving golf cart C2 of the plurality of golf-shot-tracking fairway-self-driving golf carts, the golf-ball-next-shot location W1 for said golfer since the golf-ball-next-shot location W1 for said golfer belonging to the first golf-shot-tracking fairway-self-driving golf cart C1 is closer to the second golf-shot-tracking fairway-self-driving golf cart C2. Furthermore, as shown in FIG. 5, in the second round tee off, the golf-ball-next-shot-location determining module 2 again measures, from the plurality of golf-shot-tracking fairway-self-driving golf carts, the respective golf-ball-next-shot locations W2, X2, Y2, Z2 for all of the golfers who are the group belonging to the golf-shot-tracking fairway-self-driving golf carts C1 and C2, and after the current golf-ball-next-shot location W2, X2 for one golfer measured by the first golf-shot-tracking fairway-self-driving golf cart C1 has been determined, the golf-ball-next-shot location determining module 2 measures, from the golf-shot-tracking fairway-self-driving golf cart which is closer to respective golf-ball-next-shot locations W2, X2, Y2, Z2, the golf-ball-next-shot location X2 for said golfer (in the example of FIG. 5, the golf-ball-next-shot location X2 for said golfer belonging to the first golf-shot-tracking fairway-self-driving golf cart C1 is measured from the second golf-shot-tracking fairway-self-driving golf cart C2). In this way, the total driving length of the golf-shot-tracking fairway-self-driving golf carts C1 and C2 in the fairway A of the golf course can be shortened, thereby reducing damage to the fairway A (e.g., turf) of the golf course.

Figure 6:
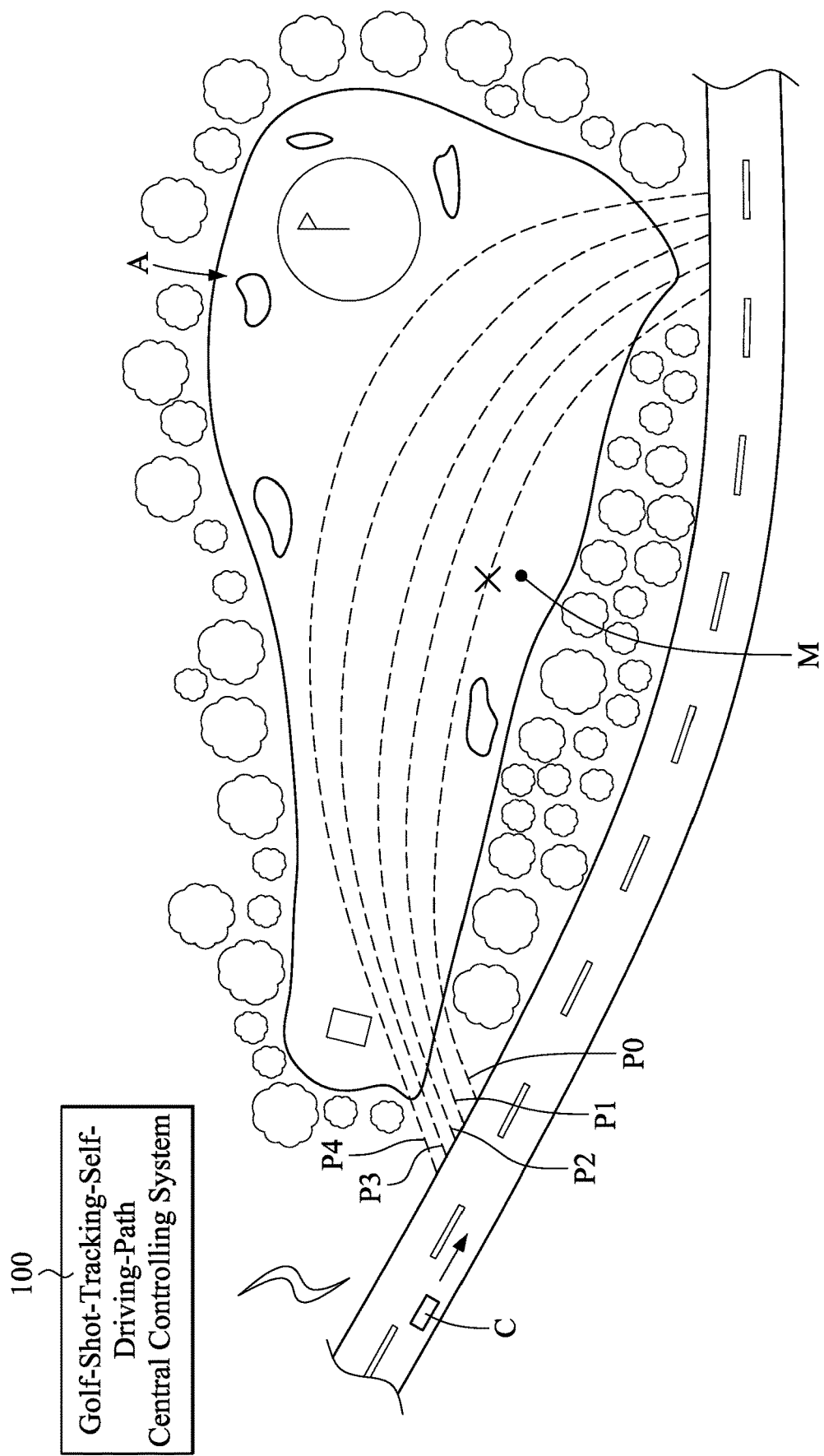
FIG. 6 is a schematic diagram illustrating the golf-shot-tracking-self-driving-path central controlling system applied to the fairway of the golf course according to the embodiment of the present invention.
Figure 7:
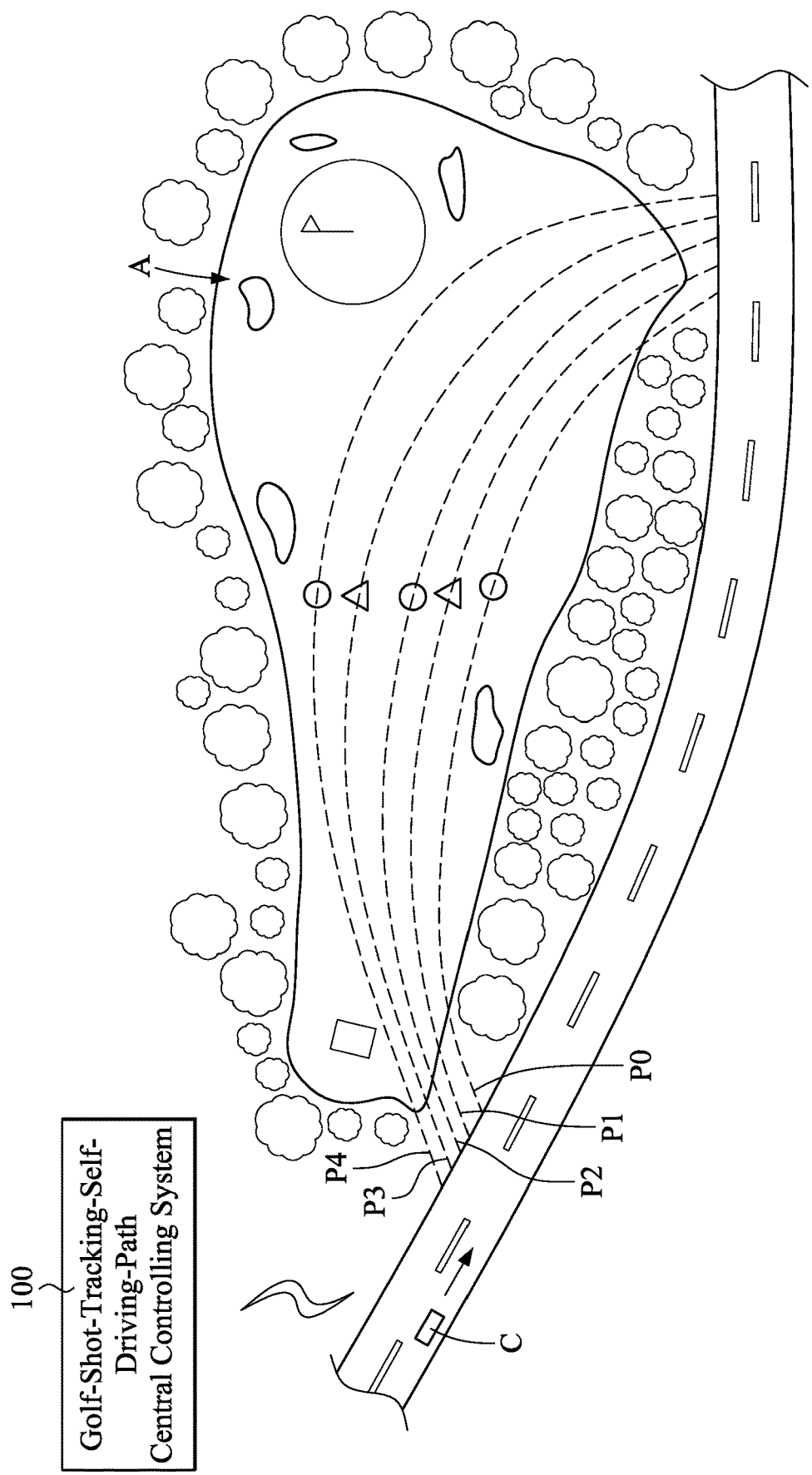
FIG. 7 is a schematic diagram illustrating the golf-shot-tracking-self-driving-path central controlling system applied to the fairway of the golf course according to the embodiment of the present invention.

The golf-shot-tracking fairway-self-driving golf carts C, C1 and C2 in the example of FIG. 2 to FIG. 5 do not drive in the predetermined path P0. The reason is that the predetermined path P0 has been excluded in advance as an unsuitable predetermined path, and the exclusion method is explained as follows. As shown in FIG. 1, FIG. 6 and FIG. 7, the predetermined path excluding determining module 4 is connected to the predetermined-paths-determining module 1, wherein the predetermined path excluding determining module 4 determines whether any unsuitable predetermined path is to be excluded from the plurality of predetermined paths P0, P1, P2, P3 and P4 (for example, the self-driving-golf-cart driving path P0 is excluded because a construction point M exists as shown in FIG. 6) such that the predetermined path/paths from which the unsuitable predetermined path has been excluded is/are assigned as suitable predetermined path/paths (i.e., P1, P2, P3 and P4) in a manner that if the excluding condition is no longer met for a previously excluded self-driving-golf-cart driving path, the suitable predetermined path/paths excluding the unsuitable predetermined path P0 is enabled to be optionally added back the unsuitable predetermined path and used as the plurality of predetermined paths (i.e., P0, P1, P2, P3 and P4). The predetermined path excluding determining module 4 determines whether any unsuitable predetermined path is to be excluded according to the turf status, the weather condition, the seasonal condition, the time, the number of golfers to be in the golf course, and the like. Furthermore, with the change of the turf status, the weather condition, the seasonal condition, the time, the number of golfers to be in the golf course, and the like, the predetermined path excluding determining module 4 may enable the suitable predetermined path/paths excluding the unsuitable predetermined path to be added back the unsuitable predetermined path. For example, a predetermined path is excluded when the predetermined path has a standing water; a predetermined path is excluded when the neighborhood of the predetermined path is under construction; a predetermined path is excluded when the predetermined path is likely to form a standing water due to rain on the day; the golf course administrator may only schedule a small number of the predetermined paths to be opened when there are a few visitors on the day; and as shown in FIG. 7, the golf course administrator may schedule the odd-numbered predetermined paths P1 and P3 (marked by a triangle symbol in FIG. 7) to be used on Mondays, Wednesdays and Fridays, and the even-numbered predetermined paths P0, P2 and P4 (marked by a circle symbol in FIG. 7) to be used on Tuesdays, Thursdays, Saturdays and Sundays. The above settings can be changed by an administrator as needed.

Figure 8:
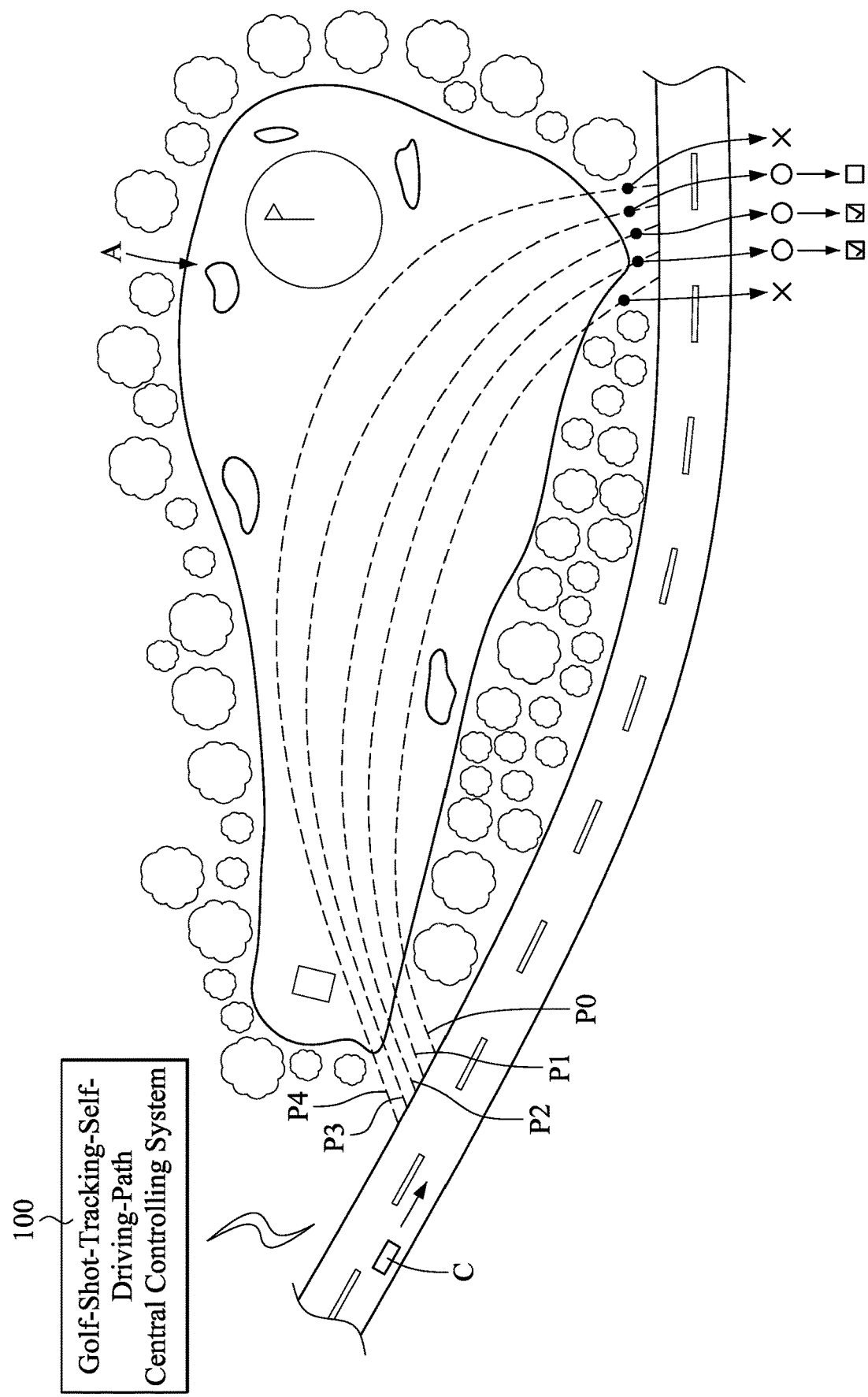
FIG. 8 is a schematic diagram illustrating the golf-shot-tracking-self-driving-path central controlling system applied to the fairway of the golf course according to the embodiment of the present invention.

As shown in FIG. 1, the path driving controlling module 3, connected to the predetermined-paths-determining module 1 and the predetermined path excluding determining module 4, is configured to receive the suitable predetermined paths from the predetermined path excluding determining module 4, and the path driving controlling module 3 determines, from the suitable predetermined paths, a predetermined path for each golf-shot-tracking fairway-self-driving golf cart C and transmits the selected predetermined path to each golf-shot-tracking fairway-self-driving golf cart C to control the predetermined path for each golf-shot-tracking fairway-self-driving golf cart C such that each golf-shot-tracking fairway-self-driving golf cart C is controlled to self-drives in one of the predetermined paths. As shown in FIG. 8, the predetermined-paths-determining module 1 determines five predetermined paths P0, P1, P2, P3 and P4, the predetermined path excluding determining module 4 excludes the predetermined paths P0 and P4 (marked by "x") such that the predetermined paths P1, P2 and P3 are the suitable predetermined paths (marked by "o"), then the path driving controlling module 3 determines, from the suitable predetermined paths P1, P2 and P3, one or more predetermined path, for example, the suitable predetermined paths P1 and P2 are selected (marked by "☑") while the suitable predetermined path P3 is not selected (marked by "☐"), and the suitable predetermined paths P1 and P2 are determined as the predetermined path such that the plurality of the golf-shot-tracking fairway-self-driving golf carts C drive in the predetermined paths P1 and P2 respectively (the predetermined path P3 is idle).

Furthermore, in the embodiment, the path driving controlling module 3 selects all or a portion of the suitable predetermined paths from the suitable predetermined paths as a candidate predetermined path group, and according to the golf-ball-next-shot-location, determines one suitable predetermined path from the candidate predetermined path group as the selected predetermined path and determines the shifting path among the suitable predetermined paths such that the golf-shot-tracking fairway-self-driving golf cart C performs self driving in the selected predetermined path and/or in the shifting path, and the path driving controlling module 3 transmits the selected predetermined path to each golf-shot-tracking fairway-self-driving golf cart C to control the predetermined path of each golf-shot-tracking fairway-self-driving golf cart C thereby guiding each golf-shot-tracking fairway-self-driving golf cart C to continuously self-drive in the predetermined path. Specifically, the path driving controlling module 3 is configured to select the candidate predetermined path group according to a self-driving area maintenance plan. The self-driving area maintenance plan is, for example, a turf maintenance, a bunker maintenance, a pipeline construction, or tree planting in various areas. Accordingly, all or a portion of the suitable predetermined paths are/is selected from the suitable predetermined paths as the selected predetermined paths/path.

As shown in FIG. 1, in the golf-shot-tracking-self-driving-path central controlling system 100 according to the embodiment of the present invention, the path driving controlling module 3 includes a wireless transmitting unit 31 that transmits the predetermined path to each golf-shot-tracking fairway-self-driving golf cart C by wireless transmission.

As shown in FIG. 1, in the golf-shot-tracking-self-driving-path central controlling system 100 according to the embodiment of the present invention, a previous neighboring group location receiving module 5 is further comprised, the previous neighboring group location receiving module 5 receives current locations of all golfers who belong to a previous neighboring group, and wherein when a shortest distance from the current locations of all the golfers who belong to the previous neighboring group to the current location of the golfer who belongs to the present group of the golf-shot-tracking fairway-self-driving golf cart C is greater than a predetermined threshold distance, the previous neighboring group location receiving module 5 transmits a golf-ball shot permission signal to notice that the golfer who belongs to the present group of the golf-shot-tracking fairway-self-driving golf cart C is permitted to shoot the golf ball. Specifically, the golf-ball-next-shot-location determining module 2 transmits the current locations of all the golfers to the path driving controlling module 3 such that the golfer who belongs to the present group of the golf-shot-tracking fairway-self-driving golf cart C can know whether the shortest distance from the current locations of all the golfers who belong to the previous neighboring group to the current location of the golfer who belongs to the present group of the golf-shot-tracking fairway-self-driving golf cart C is greater than a predetermined threshold distance or not.

With the above structure, the golf-shot-tracking-self-driving-path central controlling system 100 can centrally controls the plurality of the golf-shot-tracking fairway-self-driving golf carts C to self-drive in the fairway A of the golf course in a manner that each golf-shot-tracking fairway-self-driving golf cart C drives in one of the plurality of predetermined paths or shifts among the plurality of predetermined paths. The present invention controls the plurality of golf-shot-tracking fairway-self-driving golf carts to self-drive in the predetermined paths and/or in a shifting path by: (1) determining the plurality of predetermined paths P0, P1, P2, P3 and P4 in the fairway; (2) determining, in the golf course, a golf-ball-next-shot location W1, X1, Y1, Z1, W2, X2, Y2, Z2 which is a location of a golf ball after a golfer shoots the golf ball; and (3) determining one selected predetermined path and/or the shifting path among the plurality of predetermined paths for the plurality of golf-shot-tracking fairway-self-driving golf carts C which self-drive in the fairway A of the golf course according to the golf-ball-next-shot-location W1, X1, Y1, Z1, W2, X2, Y2, Z2 to effectively avoid damage to the unintended position in the fairway.

The above description should be considered as only the discussion of the preferred embodiments of the present invention. However, a person having ordinary skill in the art may make various modifications without deviating from the present invention. Those modifications still fall within the scope of the present invention.

What is claimed is:

1. A golf-shot-tracking-self-driving-path central controlling system, which centrally controls a plurality of golf-shot-tracking fairway-self-driving golf carts to self-drive in a fairway of a golf course in a manner that each golf-shot-tracking fairway-self-driving golf cart drives in one of a plurality of predetermined paths or shifts among the plurality of predetermined paths, the golf-shot-tracking-self-driving-path central controlling system comprising:

a predetermined-paths-determining module, which determines the plurality of predetermined paths in the fairway, wherein when the golf-shot-tracking fairway-self-driving golf cart is configured to be in a self-driving condition, in addition to shifting among the plurality of predetermined paths, the golf-shot-tracking fairway-self-driving golf cart is limited to drive within a path area of the plurality of predetermined paths;

a golf-ball-next-shot-location determining module, connected to the predetermined-paths-determining module, determining a golf-ball-next-shot location in the golf course, the golf-ball-next-shot location is a location of a golf ball after a golfer shoots the golf ball; and a path driving controlling module, connected to the predetermined-paths-determining module and the golf-ball-next-shot-location determining module, determining one selected predetermined path and/or a shifting path among the plurality of predetermined paths for the plurality of golf-shot-tracking fairway-self-driving golf carts which drive in the fairway of the golf course according to the golf-ball-next-shot-location, and controlling the plurality of golf-shot-tracking fairway-self-driving golf carts to self-drive in the selected predetermined path and/or in the shifting path, after the golfer shot the golf ball.

2. The golf-shot-tracking-self-driving-path central controlling system as claimed in claim 1, wherein the golf-ball-next-shot-location determining module determines a plurality of the golf-ball-next-shot-locations in the golf course, each golf-ball-next-shot location is a location of a golf ball after each one of a plurality of the golfers shoots the golf ball, and the path driving controlling module determines a driving route from predetermined paths and/or determines a shifting route which shifts among predetermined paths according to a positional relationship among the plurality of golf-ball-next-shot locations such that the golf-shot-tracking fairway-self-driving golf cart is configured to perform self driving in the determined driving route and/or the shifting route.

3. The golf-shot-tracking-self-driving-path central controlling system as claimed in claim 1, wherein the golf-ball-next-shot-location determining module measures, from the golf-shot-tracking fairway-self-driving golf carts, the respective golf-ball-next-shot locations for all of the golfers who are a group belonging to the golf-shot-tracking fairway-self-driving golf cart, and determines a driving route from predetermined paths and/or determines a shifting route which shifts among predetermined paths according to the respective golf-ball-next-shot location such that the golf-shot-tracking fairway-self-driving golf cart is configured to perform self driving in the determined driving route and/or the shifting route.

4. The golf-shot-tracking-self-driving-path central controlling system as claimed in claim 1, wherein the golf-ball-next-shot-location determining module measures, from the plurality of golf-shot-tracking fairway-self-driving golf carts, the respective golf-ball-next-shot locations for all of the golfers who are a group belonging to the plurality of golf-shot-tracking fairway-self-driving golf carts, and after the current golf-ball-next-shot location for one golfer measured by a first golf-shot-tracking fairway-self-driving golf cart of the plurality of golf-shot-tracking fairway-self-driving golf carts has been determined, the golf-ball-next-shot location determining module measures, from a second golf-shot-tracking fairway-self-driving golf cart of the plurality of golf-shot-tracking fairway-self-driving golf carts, the golf-ball-next-shot location for said golfer.

5. The golf-shot-tracking-self-driving-path central controlling system as claimed in claim 1, further comprising a predetermined path excluding determining module connected to the predetermined-paths-determining module, wherein the predetermined path excluding determining module determines whether any unsuitable predetermined path is to be excluded from the plurality of predetermined paths such that the predetermined path/paths from which the unsuitable predetermined path has been excluded is/are assigned as suitable predetermined path/paths in a manner that the suitable predetermined path/paths excluding the unsuitable predetermined path is enabled to be optionally added back the unsuitable predetermined path and used as the plurality of predetermined paths.

6. The golf-shot-tracking-self-driving-path central controlling system as claimed in claim 5, wherein the path driving controlling module selects all or a portion of the suitable predetermined paths from the suitable predetermined paths as a candidate predetermined path group, and according to the golf-ball-next-shot-location, determines one suitable predetermined path from the candidate predetermined path group as the selected predetermined path and determines the shifting path among the suitable predetermined paths such that the golf-shot-tracking fairway-self-driving golf cart performs self driving in the selected predetermined path and/or in the shifting path, and the path driving controlling module transmits the selected predetermined path to each golf-shot-tracking fairway-self-driving golf cart to control each golf-shot-tracking fairway-self-driving golf cart continuously drive in the predetermined path.

7. The golf-shot-tracking-self-driving-path central controlling system as claimed in claim 6, wherein the path driving controlling module selects the candidate predetermined path group according to a self-driving area maintenance plan.

8. The golf-shot-tracking-self-driving-path central controlling system as claimed in claim 1, wherein the path driving controlling module determines, from a plurality of predetermined shifting paths, the shifting path among the predetermined paths, wherein the plurality of the predetermined shifting paths are determined in advance according to fairway related information.

9. The golf-shot-tracking-self-driving-path central controlling system as claimed in claim 1, further comprising a previous neighboring group location receiving module, which receives current locations of all golfers who belong to a previous neighboring group, and wherein when a shortest distance from the current locations of all the golfers who belong to the previous neighboring group to the current location of the golfer who belongs to the present group of the golf-shot-tracking fairway-self-driving golf cart is greater than a predetermined threshold distance, the previous neighboring group location receiving module transmits a golf-ball shot permission signal to notice that the golfer who belongs to the present group of the golf-shot-tracking fairway-self-driving golf cart is permitted to shoot the golf ball.

* * * * *